US010031917B2

(12) United States Patent
Kumarasamy et al.

(10) Patent No.: US 10,031,917 B2
(45) Date of Patent: Jul. 24, 2018

(54) EFFICIENT VOLUME-LEVEL REPLICATION OF DATA VIA SNAPSHOTS IN AN INFORMATION MANAGEMENT SYSTEM

(71) Applicant: CommVault Systems, Inc., Oceanport, NJ (US)

(72) Inventors: Paramasivam Kumarasamy, Morganville, NJ (US); Durga Prasad Chedalavada, Dummugudem Mandal (IN)

(73) Assignee: COMMVAULT SYSTEMS, INC., Tinton Falls, NJ (US)

( * ) Notice: Subject to any disclaimer, the term of this patent is extended or adjusted under 35 U.S.C. 154(b) by 286 days.

(21) Appl. No.: 14/446,159

(22) Filed: Jul. 29, 2014

(65) Prior Publication Data

US 2016/0034481 A1 Feb. 4, 2016

(51) Int. Cl.
 *G06F 17/30* (2006.01)
(52) U.S. Cl.
 CPC .... *G06F 17/30088* (2013.01); *G06F 2201/84* (2013.01)
(58) Field of Classification Search
 CPC ............. G06F 2201/84; G06F 11/1448; G06F 11/1466; G06F 11/1469; G06F 11/1435;
 (Continued)

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

AU 2004227949 10/2004
CA 2498174 3/2004
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Dennis Truong
(74) *Attorney, Agent, or Firm* — Commvault Systems, Inc.

(57) ABSTRACT

The illustrative systems and methods use a special-purpose volume-replicating server(s) to offload client computing devices operating in a production environment. The production environment may remain relatively undisturbed while production data is replicated to a geographically distinct destination. Replication is based in part on hardware-based snapshots generated by a storage array that houses production data. The illustrative volume-replicating server efficiently moves data from snapshots on a source storage array to a destination storage array by transferring only changed blocks for each successive snapshot, i.e., transferring incremental block-level changes. Periodic restore jobs may be executed by destination clients to keep current with their corresponding source production clients. Accordingly, after the source data center goes offline, production data may be speedily restored at the destination data center after experiencing only minimal downtime of production resources. By employing block-level techniques, the disclosed solutions avoid the file-based data management approaches of the prior art, which tend to be too time-consuming and resource-intensive for the present scenario.

14 Claims, 11 Drawing Sheets

(58) Field of Classification Search
CPC ............. G06F 11/1446; G06F 11/1471; G06F 11/1458; G06F 11/1464; G06F 11/1461; G06F 3/0685; G06F 3/0647; G06F 3/065; G06F 3/0683; G06F 17/30094; G06F 17/30212; G06F 17/30194; G06F 17/30215; G06F 17/30575; G06F 17/30088; G06F 11/3006; Y10S 707/99955
USPC ................. 707/649, 639, 640, 679; 711/162; 714/15, 20
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,209,972 B1 | 4/2007 | Ignatius |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,343,453 B2 | 3/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,472,142 B2 | 12/2008 | Prahlad |
| 7,484,054 B2 | 1/2009 | Kottomtharayil et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,568,080 B2 | 7/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,720,801 B2* | 5/2010 | Chen .................. G06F 11/2066 707/613 |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,890 B2 | 8/2010 | Littlefield |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,882,067 B2 | 2/2011 | Saika |
| 8,055,627 B2 | 11/2011 | Prahlad |
| 8,073,969 B2 | 12/2011 | Littlefield |
| 8,156,086 B2 | 4/2012 | Lu et al. |
| 8,170,995 B2 | 5/2012 | Prahlad et al. |
| 8,190,565 B2 | 5/2012 | Prahlad et al. |
| 8,195,623 B2 | 6/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan et al. |
| 8,370,542 B2 | 2/2013 | Lu et al. |
| 8,392,370 B1* | 3/2013 | Whitney ................. G06F 3/067 707/640 |
| 8,515,911 B1* | 8/2013 | Zhou .................. G06F 17/3023 707/638 |
| 8,578,120 B2 | 11/2013 | Attarde et al. |
| 8,589,347 B2 | 11/2013 | Erofeev |
| 8,612,394 B2 | 12/2013 | Prahlad |
| 8,645,320 B2 | 2/2014 | Prahlad et al. |
| 8,677,091 B2 | 3/2014 | Littlefield |
| 8,726,242 B2 | 5/2014 | Ngo |
| 8,745,105 B2 | 6/2014 | Erofeev |
| 8,789,208 B1 | 7/2014 | Sundaram |
| 8,805,786 B1* | 8/2014 | Natanzon ............ G06F 11/2064 707/639 |
| 9,124,611 B2 | 9/2015 | Littlefield |
| 9,164,850 B2 | 10/2015 | Prahlad |
| 9,244,779 B2 | 1/2016 | Littlefield |
| 9,400,803 B2 | 7/2016 | Littlefield |
| 9,558,072 B1* | 1/2017 | Mam .................. G06F 11/1451 |
| 2002/0083366 A1* | 6/2002 | Ohran ................. G06F 11/2082 714/13 |
| 2003/0182313 A1* | 9/2003 | Federwisch ......... G06F 11/2066 |
| 2004/0030951 A1* | 2/2004 | Armangau .......... G06F 11/1469 714/6.11 |
| 2004/0167941 A1 | 8/2004 | Prahald |
| 2006/0224846 A1 | 10/2006 | Amarendran et al. |
| 2007/0033237 A1 | 2/2007 | Prahlad |
| 2007/0185915 A1* | 8/2007 | Prahlad .............. G06F 17/30528 |
| 2008/0147754 A1 | 6/2008 | Littlefield |
| 2008/0147836 A1 | 6/2008 | Littlefield |
| 2008/0147997 A1 | 6/2008 | Littlefield |
| 2009/0164532 A1 | 6/2009 | Pralad |
| 2009/0193206 A1* | 7/2009 | Ishii ..................... G06F 3/0607 711/162 |
| 2009/0319534 A1 | 12/2009 | Gokhale |
| 2010/0005259 A1* | 1/2010 | Prahlad .............. G06F 11/1435 711/162 |
| 2010/0070726 A1* | 3/2010 | Ngo .................... G06F 11/1464 711/162 |

(56) References Cited

U.S. PATENT DOCUMENTS

| | | | |
|---|---|---|---|
| 2010/0077165 A1* | 3/2010 | Lu | G06F 11/1451 711/162 |
| 2010/0223373 A1 | 9/2010 | Littlefield | |
| 2010/0299490 A1 | 11/2010 | Attarde et al. | |
| 2011/0035419 A1 | 2/2011 | Littlefield | |
| 2011/0035621 A1 | 2/2011 | Littlefield | |
| 2011/0138225 A1* | 6/2011 | Gunabalasubramaniam | G06F 11/1417 714/15 |
| 2011/0231698 A1* | 9/2011 | Zlati | G06F 11/3006 714/3 |
| 2012/0036108 A1 | 2/2012 | Prahlad | |
| 2012/0084523 A1 | 4/2012 | Littlefield | |
| 2012/0150818 A1 | 6/2012 | Vijayan Retnamma et al. | |
| 2012/0150826 A1 | 6/2012 | Vijayan Retnamma et al. | |
| 2012/0317079 A1* | 12/2012 | Shoens | G06F 17/30215 707/639 |
| 2014/0046900 A1 | 2/2014 | Kumarasamy et al. | |
| 2014/0108355 A1 | 4/2014 | Prahlad | |
| 2014/0181028 A1 | 6/2014 | Prahlad et al. | |
| 2014/0201250 A1 | 7/2014 | Littlefield | |
| 2015/0269144 A1 | 9/2015 | Littlefield | |
| 2016/0004721 A1 | 1/2016 | Iyer | |
| 2016/0147472 A1 | 5/2016 | Littlefield | |

FOREIGN PATENT DOCUMENTS

| | | |
|---|---|---|
| CA | 2548542 | 6/2005 |
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, May 1991, New York, US, pp. 1-15.

Catalogic Software Solutions Sheet, "Universal Data Protection Built on NetApp," 2013.

* cited by examiner

EFFICIENT VOLUME-LEVEL REPLICATION OF DATA VIA SNAPSHOTS IN AN INFORMATION MANAGEMENT SYSTEM

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the explosive growth of data under management, companies also continue to seek innovative techniques for not just protecting existing data, but also for managing data centers and the movement of data from one data center to another.

SUMMARY

Time is of the essence when managing a data center move or expansion to another geographic location. Because the production environment is business-critical, downtime in such circumstances is highly undesirable. When the amount of primary data (i.e., "live" production data) to be moved from one data center to another is sufficiently large, e.g., hundreds of petabytes, ordinary networked data transmissions may take hours or even days. Likewise, physically moving data storage devices from one geography to another may be impractical, risky, or take even longer than network-based transmissions. This kind of downtime is likely to be unacceptable, and therefore a more efficient and speedy technology solution is needed.

The present inventor devised systems and methods for executing a relatively speedy and efficient data center move across geographies, based on storage management technology in an enhanced information management system. Enhancements are disclosed for storage manager and data agent operations in conjunction with a special-purpose volume-replicating server that may offload production clients from the ongoing replication operations.

The illustrative systems and methods use a special-purpose volume-replicating server(s) to offload client computing devices operating in a production environment. The production environment may remain relatively undisturbed while production data is replicated to a geographically distinct destination. Replication is based in part on hardware-based snapshots generated by a storage array that houses production data in the source data center. The illustrative volume-replicating server efficiently moves data from snapshots on a source storage array to a destination storage array by transferring only changed blocks for each successive snapshot, i.e., transferring incremental changes. Periodic restore jobs may be executed by destination clients to keep current with their corresponding source production clients. Accordingly, after the source data center goes offline, production data may be speedily restored at the destination data center after experiencing only minimal downtime of production resources. By employing block-level techniques, the disclosed solutions avoid the file-based data management approaches of the prior art, which tend to be too time-consuming and resource-intensive for the present scenario.

DETAILED DESCRIPTION

Systems and methods are disclosed for volume-level replication, via snapshots, of data that is generated in an information management system. Examples of such systems and methods are described in further detail herein, in reference to FIGS. 2-5. The components and functionality according to the present invention may also or alternatively be configured and/or incorporated into information management systems such as those described herein in FIGS. 1A-1H.

As noted, prior-art replication solutions that are directed at file-based data management (see, e.g., U.S. Pat. Nos. 7,529,782; 8,352,422; 8,726,242; 8,745,105; etc.), tend to be unsuitable for the present scenario, which requires that downtime in the production environment be minimized if not altogether eliminated. For example, some of the prior art solutions rely on client computing devices (e.g., data agents and drivers executing thereon) to handle replication operations and/or content indexing, which may unacceptably tax the computing resources of the production environment, and may later likewise tax computing resources in restoring data at the destination. For example, some of the prior art solutions enable stubbing-based restores, which may delay an application on the client computing device from fully operating from restored data. In contrast, the illustrative embodiment according to the present invention overcomes some of these disadvantages, as described in further detail below.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
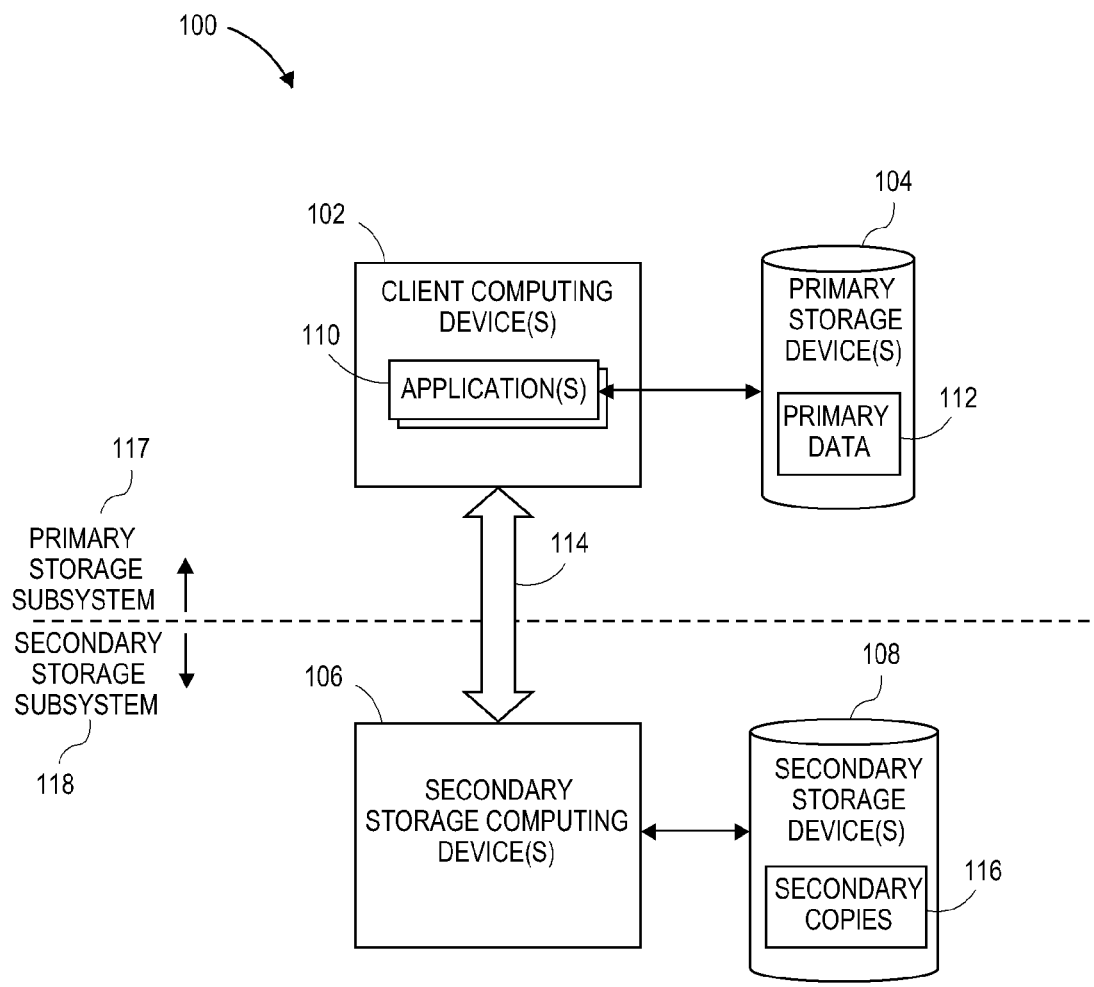
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";
U.S. Pat. No. 7,107,298, entitled "System And Method For Archiving Objects In An Information Store";
U.S. Pat. No. 7,246,207, entitled "System and Method for Dynamically Performing Storage Operations in a Computer Network";
U.S. Pat. No. 7,315,923, entitled "System And Method For Combining Data Streams In Pipelined Storage Operations In A Storage Network";
U.S. Pat. No. 7,343,453, entitled "Hierarchical Systems and Methods for Providing a Unified View of Storage Information";
U.S. Pat. No. 7,395,282, entitled "Hierarchical Backup and Retrieval System";
U.S. Pat. No. 7,529,782, entitled "System and Methods for Performing a Snapshot and for Restoring Data";
U.S. Pat. No. 7,617,262, entitled "System and Methods for Monitoring Application Data in a Data Replication System";
U.S. Pat. No. 7,747,579, entitled "Metabase for Facilitating Data Classification";
U.S. Pat. No. 8,156,086, entitled "Systems And Methods For Stored Data Verification";
U.S. Pat. No. 8,170,995, entitled "Method and System for Offline Indexing of Content and Classifying Stored Data";
U.S. Pat. No. 8,229,954, entitled "Managing Copies Of Data";
U.S. Pat. No. 8,230,195, entitled "System And Method For Performing Auxiliary Storage Operations";
U.S. Pat. No. 8,285,681, entitled "Data Object Store and Server for a Cloud Storage Environment, Including Data Deduplication and Data Management Across Multiple Cloud Storage Sites";
U.S. Pat. No. 8,307,177, entitled "Systems And Methods For Management Of Virtualization Data";
U.S. Pat. No. 8,352,422, entitled "Data Restore Systems and Methods in a Replication Environment";
U.S. Pat. No. 8,364,652, entitled "Content-Aligned, Block-Based Deduplication";
U.S. Pat. No. 8,578,120, entitled "Block-Level Single Instancing";
U.S. Pat. No. 8,726,242, entitled "Systems and Methods for Continuous Data Replication;"
U.S. Pat. No. 8,745,105, entitled "Systems and Methods for Performing Data Replication";
U.S. Pat. Pub. No. 2006/0224846, entitled "System and Method to Support Single Instance Storage Operations";
U.S. Pat. Pub. No. 2009/0319534, entitled "Application-Aware and Remote Single Instance Data Management";
U.S. Pat. Pub. No. 2012/0150818, entitled "Client-Side Repository in a Networked Deduplicated Storage System";
U.S. Pat. Pub. No. 2012/0150826, entitled "Distributed Deduplicated Storage System"; and
U.S. Pat. Pub. No. 2014/0046900, entitled "Generic File Level Restore from a Block-Level Secondary Copy".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation:

the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
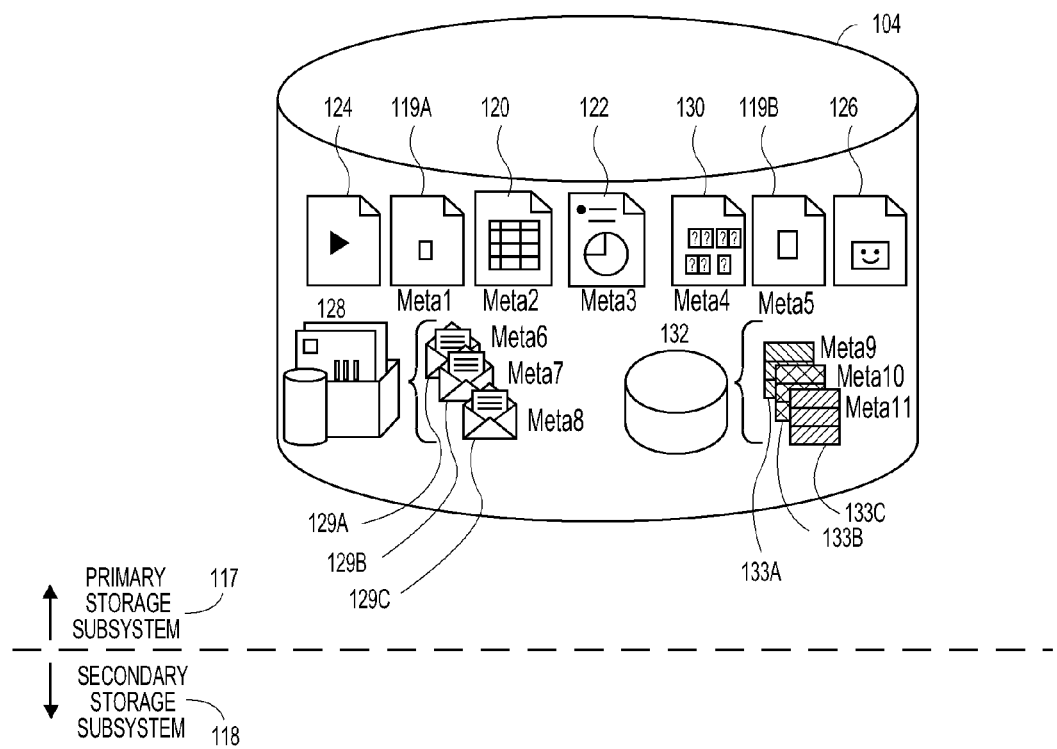
FIG. 1B is a detailed view of a primary storage device, a secondary storage device, and some examples of primary data and secondary copy data.
Figure 1B:
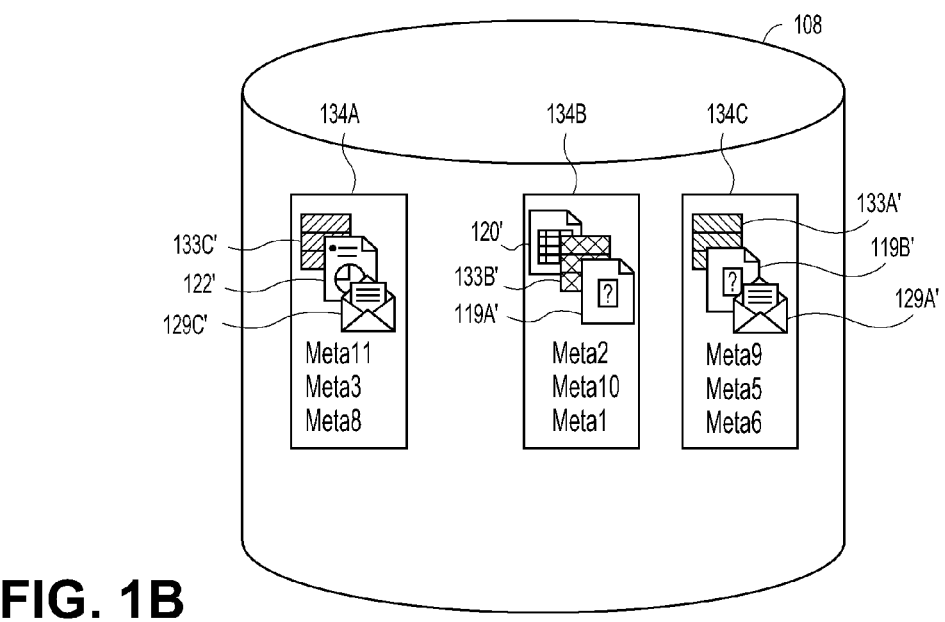

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
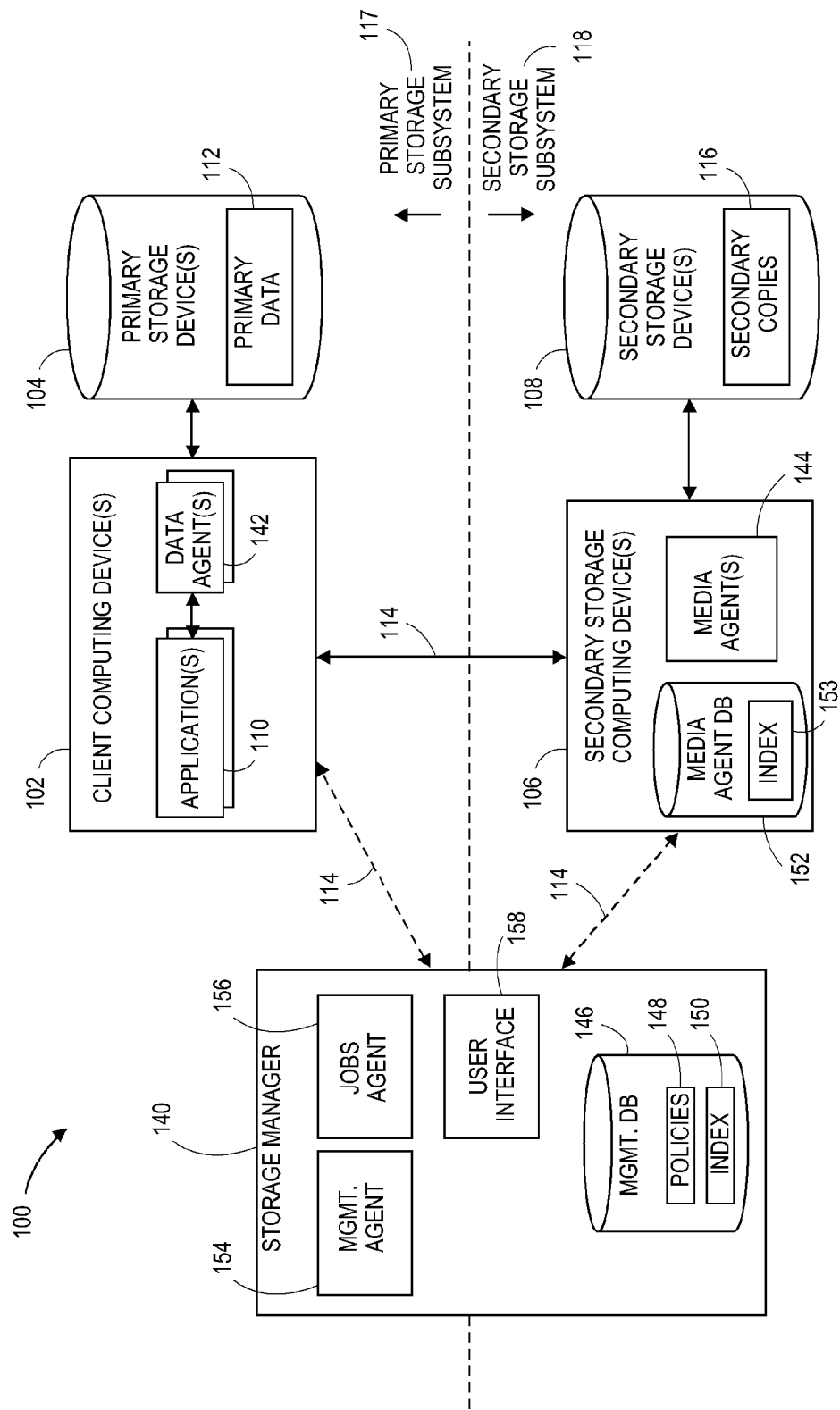
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
 initiating execution of secondary copy operations;
 managing secondary storage devices 108 and inventory/capacity of the same;
 reporting, searching, and/or classification of data in the information management system 100;
 allocating secondary storage devices 108 for secondary storage operations;
 monitoring completion of and providing status reporting related to secondary storage operations;
 tracking age information relating to secondary copies 116, secondary storage devices 108, and comparing the age information against retention guidelines;
 tracking movement of data within the information management system 100;
 tracking logical associations between components in the information management system 100;
 protecting metadata associated with the information management system 100; and
 implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
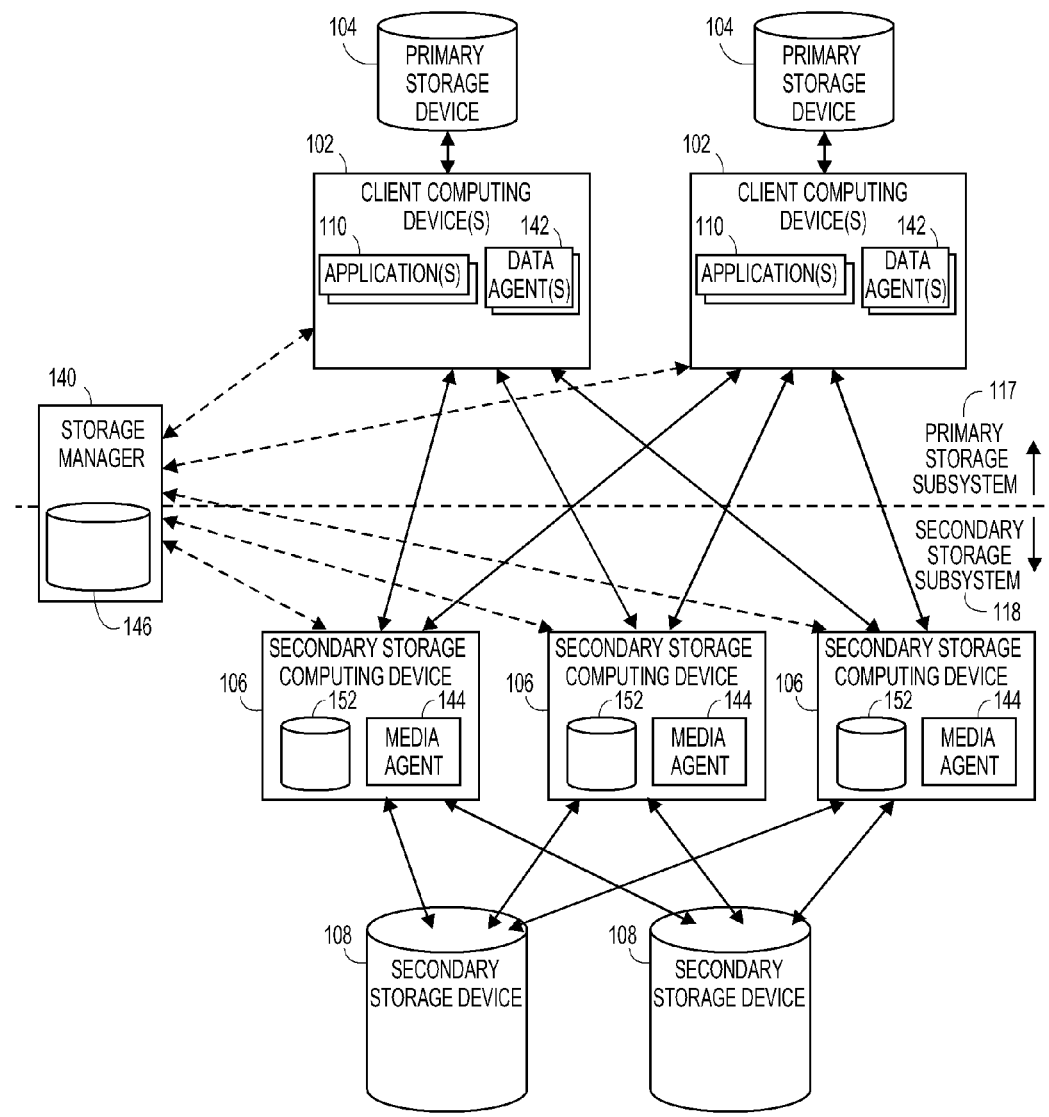
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate.

The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
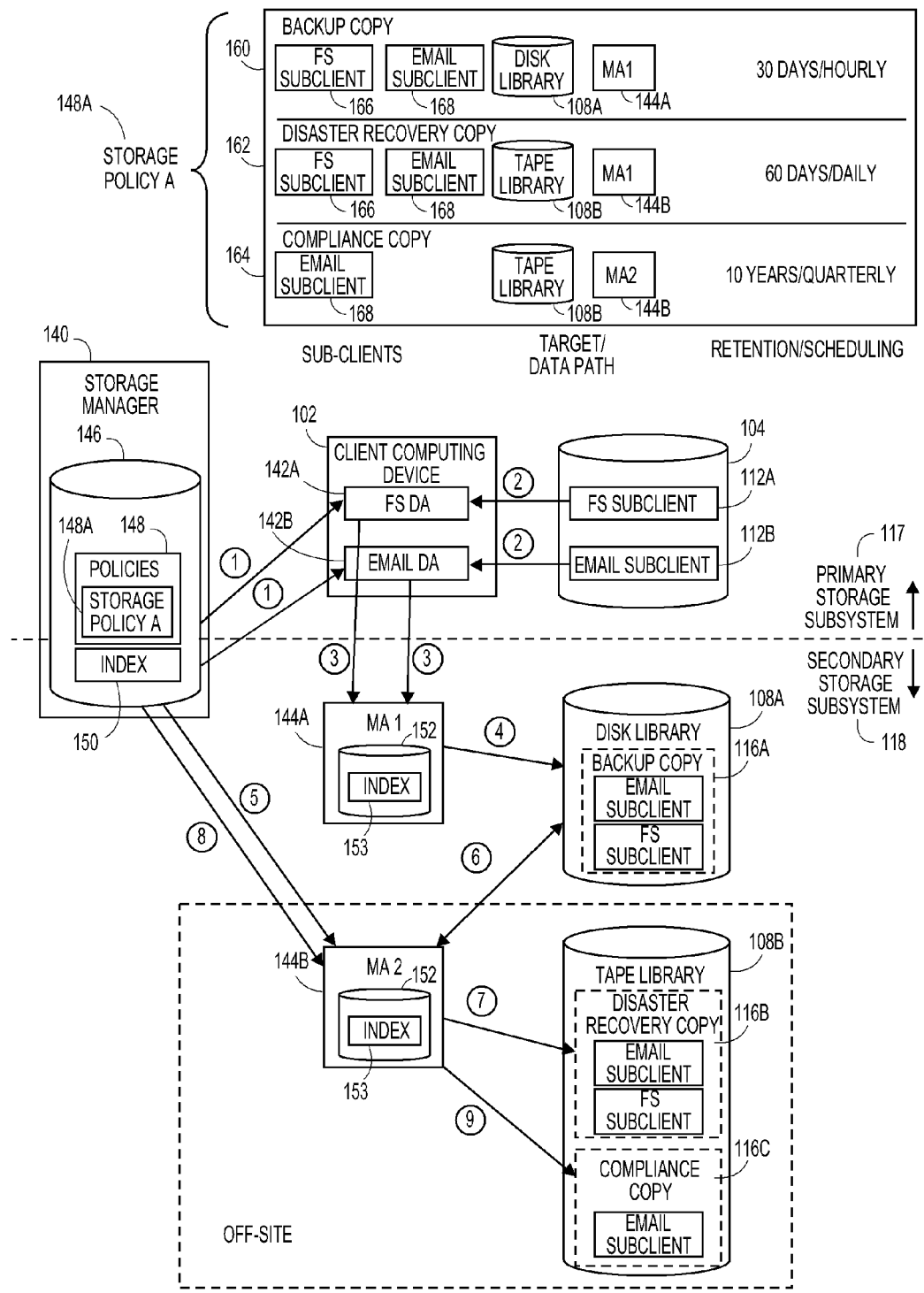
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
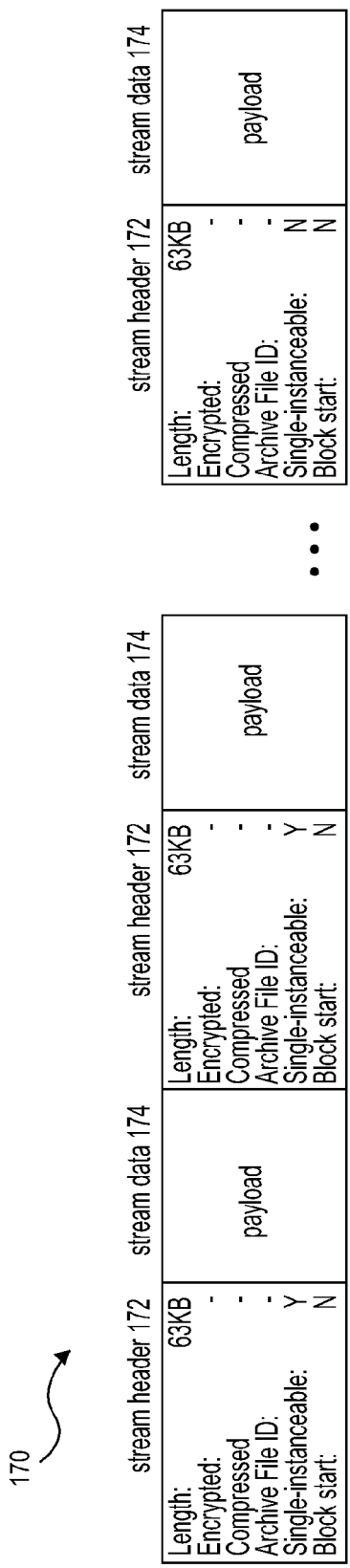
FIGS. 1F-1H are block diagrams illustrating suitable data structures that may be employed by the information management system.
Figure 1G:
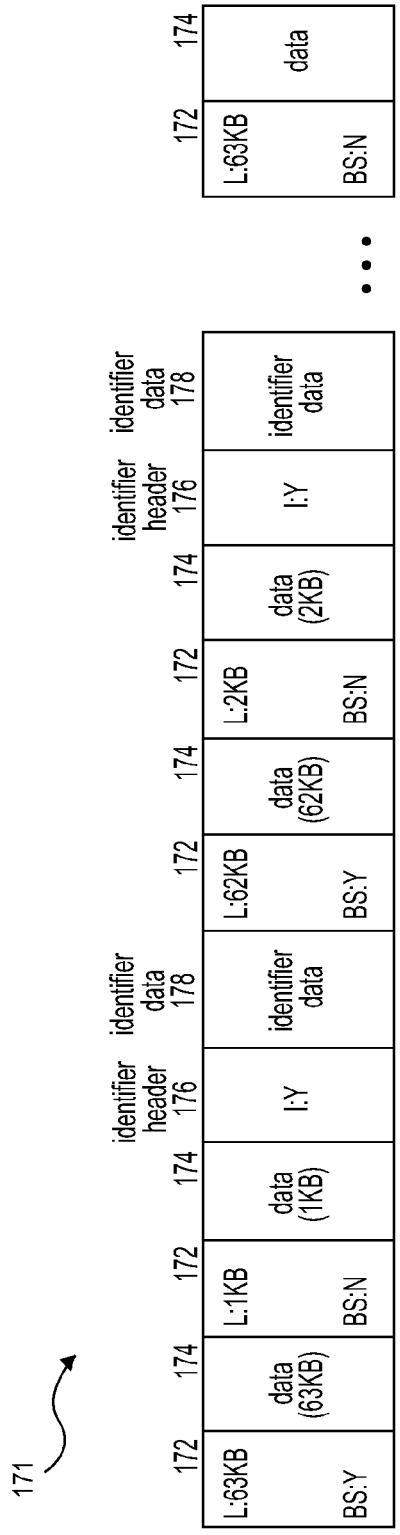

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
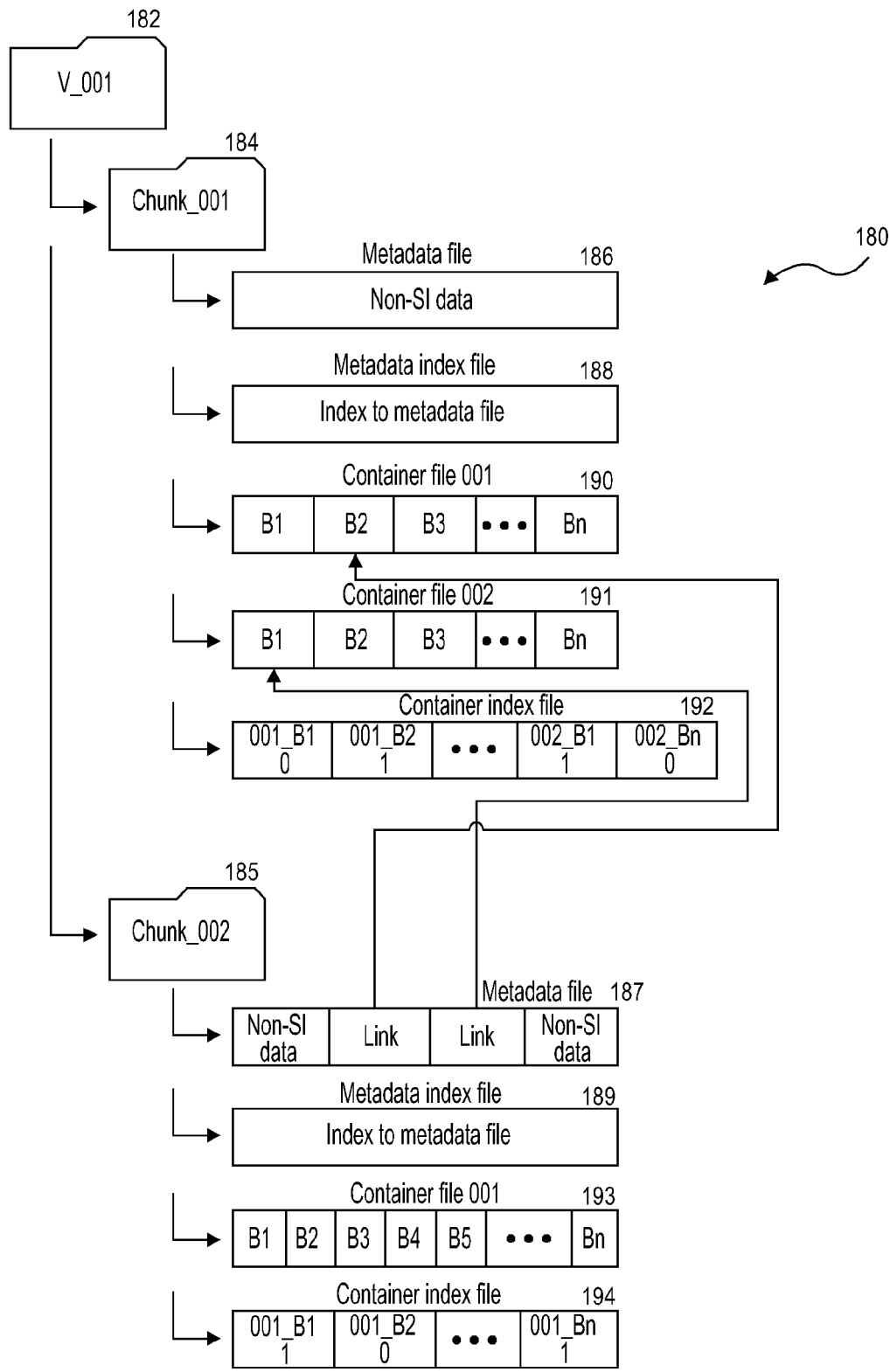

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Figure 2:
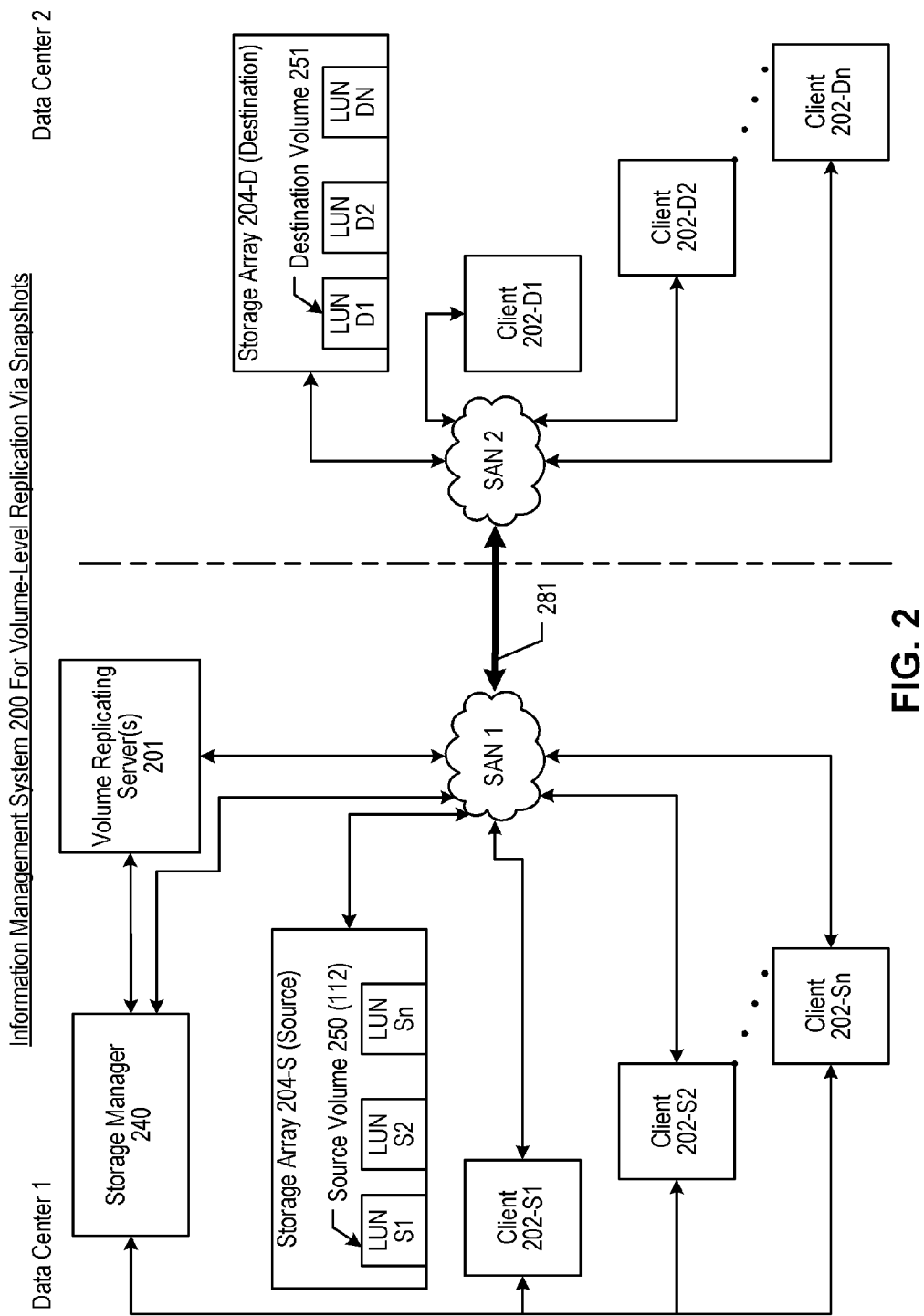
FIG. 2 is a block diagram illustrating some salient portions of an information management system 200 for volume-level replication of data via snapshots, according to an illustrative embodiment of the present invention.

Efficient Volume-Level Replication of Data Via Snapshots in an Information Management System Time is of the essence when managing a data center move or expansion to another geographic location. Because the production environment is business-critical, downtime in such circumstances is highly undesirable. When the amount of primary data (i.e., "live" production data) to be moved from one data center to another is sufficiently large, e.g., hundreds of petabytes, ordinary networked data transmissions may take hours or even days. Likewise, physically moving data storage devices from one geography to another may be impractical, risky, or take even longer than network-based transmissions. This kind of downtime is likely to be unacceptable, and therefore a more efficient and speedy technology solution is needed. The systems and methods herein provide for executing a relatively speedy and efficient data center move across geographies, based on storage management technology in an enhanced information management system. FIG. 2 illustrates an exemplary configuration for executing a relatively speedy and efficient data center move across geographies, using a special-purpose volume-replicating server(s) to offload processing resources on the client computing devices in the production environment.

FIG. 2 is a block diagram illustrating some salient portions of an information management system 200 for volume-level replication of data via snapshots, according to an illustrative embodiment of the present invention. System 200 comprises: volume-replicating server(s) 201; clients 202-D1, . . . , 202-Dn; clients 202-S1, . . . , 202-Sn; storage array 204-D; storage array 204-S; and storage manager 240. The components are illustratively interconnected as shown, including via storage array network SAN 1, storage array network SAN 2, and communication pathway 281. FIG. 2 also depicts the components situated in Data Center 1 (to the left of the dashed line), which is the source of the data to be moved, and in Data Center 2 (to the right of the dashed line), which is the destination.

Components in Data Center 1 (Sources of Data).

Volume replicating server(s) 201. Preferably, a given volume replicating server 201 may be configured to correspond to the operating system of a client 202-S. Thus, in an information management system that comprises clients having a variety of operating systems (e.g., Linux, AIX, Windows, etc.) one or more operating-system-specific volume replicating servers 201 may be configured to correspond to the operating system(s) of the respective client whose primary data is to be replicated, and preferably shall operate in conjunction with one or more clients having the same matching operating system. Volume replicating server(s) 201 are shown here in data center 1, but in alternative embodiments, one or more volume replicating servers 201 may be located in data center 2, or in another location, e.g., cloud, etc. Volume replicating server(s) 201 are described in more detail in later figures.

Clients 202-S1, . . . , 202-Sn are client computing devices analogous to client 102, and may additionally comprise enhanced functionality (e.g., enhanced data agent 342-S, etc.) to enable them to operate within system 200, as described here and in more detail in subsequent figures. Clients 202-S may be referred to herein as source clients. Each client 202-S may be in communication with one or more logical disks that are part of storage array 204-S, and each of which is uniquely identified by a logical unit number ("LUN"). Communications between client and LUN may be established by mounting the LUN to the client, for example. As a shorthand herein, a client is said to be in communication with the respective LUN, even when the physical connectivity may be indirect, e.g., via SAN 1 as shown. Illustratively, client 202-S1 is in communication with LUN S1; client 202-S2 is in communication with LUN S2, etc.

Each client 202-S may generate data, and thus represents a source of data that needs to be moved efficiently from Data Center 1 to Data Center 2 according to the present embodiment. For example, an application 110 that executes on the client (e.g., a database application) may generate primary data, which is stored in a volume configured in the LUN. Illustratively, primary data 112 (generated by client 202-S1), may reside in source volume 250 in LUN S1.

Storage array 204-S may be any storage array known in the art that supports one or more LUNs to be mounted to respective client computing devices, such as the clients depicted here. Storage array 204-S comprises LUN S1 (mounted to client 202-S1), LUN S2 (mounted to client 202-S2), . . . , and LUN Sn (mounted to client 202-Sn). There is no limit to the amount of storage or number of LUNs in storage array 204-S.

Furthermore, storage array 204-S may comprise hardware-based snapshot capability, such that storage array 204-S may execute hardware snapshots in response to instructions (e.g., messages, flags, operational parameters, etc.) issued by other components of system 200, such as storage manager 240, client 202-S, and/or volume-replicating server 201. The hardware snapshots are discussed further in a subsequent figure.

Storage manager 240 is analogous to storage manager 140, and additionally comprises enhanced functionality for operating according to the illustrative embodiment. In general, storage manager 240 manages information management system 200, including management of volume-level replication operations according to the illustrative embodiment. To do this, storage manager 240 communicates with other components via messages, instructions, status queries/reporting, etc. Specifically, volume-level replication of data from data center 1 to data center 2 is largely managed by storage manager 240, as described in further detail in subsequent figures. In some alternative embodiments, storage manager 240 may play a modified role, e.g., delegating the management of volume-level replication to a given client (e.g., 202-S1, etc.) and/or to a volume-replicating server 201 associated with the given client.

Source volume 250 comprises primary data 112, and is illustratively configured in LUN S1, which is mounted to client 202-S1. Thus, primary data 112 generated by client 202-S1 is stored in source volume 250.

Communication pathway 281, connecting SAN 1 and SAN 2, provides high-speed physical data communications infrastructure between data center 1 and data center 2, e.g., Fibre channel, etc.

Storage area network 1 (SAN 1) is well known in the art, and illustratively interconnects several components located in data center 1 as shown, as well as providing high-speed communications to SAN 2. Some of the logical connections between certain components will be discussed in more detail in a later figure. In some alternative embodiments, different interconnectivity may be configured at data center 1, e.g., without SAN 1, using direct connections between components, or some combination thereof, etc.

Components in Data Center 2 (Destinations).

Clients 202-D1, . . . , 202-Dn are client computing devices analogous to client 102, and may additionally comprise enhanced functionality (e.g., enhanced data agent 342-D, etc.) to enable them to operate within system 200, as described here and in more detail in subsequent figures. Clients 202-D may be referred to herein as destination clients. Each client 202-D is configured to operationally correspond to a source client, e.g., 202-D1 corresponds to 202-S1, etc. In this context, operational correspondence refers to clients being configured with matching operating system, main memory, applications and file system for the primary data, logical disks (e.g., LUN size), and other operational parameters. Operational correspondence is important, because the source data is replicated and then restored without making use of file system drivers and/or other translation technologies (e.g., file structure and file system metadata) that tend to slow down the speed of replication and restoration which are necessary in the present embodiment. Thus, the destination client may quickly gain access to the complete volume of data replicated from data center 1 so that the destination application(s) may immediately use the data with minimal downtime between the source client going offline and the destination client coming online, as explained further below.

Each client 202-D may be in communication with one or more logical disks that are part of storage array 204-D, and each of which is uniquely identified by a logical unit number ("LUN"). Communications between client and LUN may be established by mounting the LUN to the client, for example. Illustratively, client 202-D1 is in communication with LUN D1; client 202-D2 is in communication with LUN D2, etc.

Storage array 204-D may be any storage array known in the art that supports one or more LUNs to be mounted to respective client computing devices, such as the destination clients depicted here. Storage array 204-D comprises LUN D1 (mounted to client 202-D1), LUN D2 (mounted to client 202-D2), . . . , and LUN Dn (mounted to client 202-Dn). There is no limit to the amount of storage or number of LUNs in storage array 204-D. However, each destination LUN (e.g., LUN D1, etc.) is configured to operationally correspond to a LUN on storage array 204-S, e.g., same size. Storage array 204-D may comprise hardware-based snapshot capability analogous to storage array 204-S.

Destination volume 251 is illustratively configured in LUN D1, which is mounted to client 202-D1. Thus, primary data 112 that is replicated from source volume 250 in storage array 204-S ultimately is stored to destination volume 251 and accessed by client 202-D1 following a restore operation.

Storage area network 2 (SAN 2) is well known in the art, and illustratively interconnects several components located in data center 2 as shown as well as high-speed communications to SAN 1. Some of the logical connections between certain components will be discussed in more detail in a later figure. In some alternative embodiments, different interconnectivity may be configured at data center 2, e.g., without SAN 2, using direct connections between components, or some combination thereof, etc.

Figure 3:
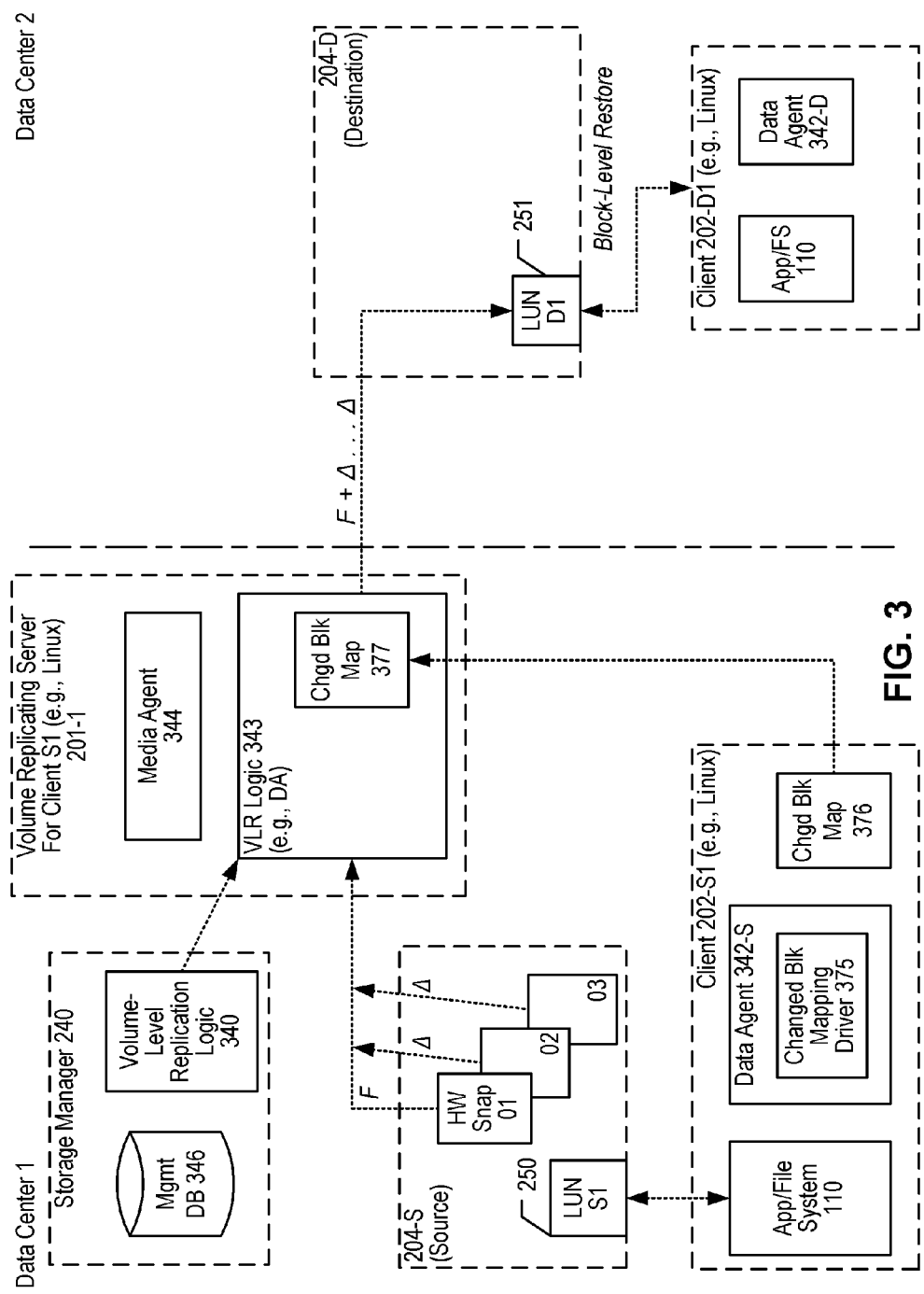
FIG. 3 is a block diagram illustrating some salient details of system 200.

FIG. 3 is a block diagram illustrating some salient details of system 200 depicted in FIG. 2, including some logical communication pathways between certain components (dotted lines). The logical communication pathways indicated by the dotted lines may carry payload data and/or messaging between the respective components. For example, application 110 on source client 202-S1 reads and writes data from/to source volume 250 in LUN S1; likewise after the replication job completes to the destination volume 251, destination client 202-D1 may restore data from destination volume 251, which becomes available to be read and written by application 110 executing on the destination client. These logical paths are depicted here to ease understanding of the present disclosure, based on the physical infrastructure described above (e.g., Fibre channel between data center 1 and data center 2) or any other suitable electronic communications.

Illustratively, source client 202-S1, volume-replicating server 201, and destination client 202-D1 all have operational correspondence, e.g., matching operating systems such as Linux, etc. Likewise, LUN S1 and LUN D1 are of the same size to accommodate the source volume 250 and destination volume 251, respectively. There is no limitation on the type of operating system and size of source/destination volume the present invention may support in reference to these components.

Application 110, which is described in more detail earlier herein, may be and/or comprise a file system. There is no limitation on the type of application/file system the present invention may support, though preferably the application/file system on the destination client should operationally correspond (e.g., type, version, main memory allocation, etc.) to the one on the source client.

Volume-level replication logic module 340 is a functional component of storage manager 240, and may be implemented as executable software and/or firmware, which executes on the underlying computing device that hosts storage manager 240. When it executes according to the illustrative embodiment, module 340 is largely responsible for managing volume-level replication according to the illustrative embodiment, including interoperating with the illustrative volume replicating server 201, client 202-S1 (e.g., via data agent 342-S), and source storage array 204-S, as well as with client 202-D1 (e.g., via data agent 342-D). Module 340 may also interoperate with destination storage array 204-D.

For example, module 340 may invoke volume-replication jobs in reference to a given client and/or source volume; may instruct storage array 204-S and/or storage array 204-D (e.g., to generate and store snapshots); may instruct data agent 342-S to track changed blocks on writes to volume 250 and to map the changed blocks in a data structure such as changed block map 376; may instruct volume-replicating server 201 to execute block transfers from source storage array 204-S to destination storage array 204-D; may coordinate the timing of snapshots requested of storage array 204-S with the tracking/mapping of changed blocks performed by client 202-S1; may manage block-level restore operations at destination client 202-D1; may query for, receive, generate, and/or store metadata about one or more volume-level replication jobs, etc.

Module 340 is shown here as a distinct component to ease understanding of the present disclosure, however, alternative embodiments are also possible within the scope of the present invention. Module 340 may be embodied as a unified module within storage manager 240, layered on existing storage manager code, or may be a logical construct whose functionality is distributed through one or more other functional modules of the storage manager, such as management agent 154 and/or jobs agent 156 and/or user interface 158—and in any combination thereof. In some alternative embodiments, module 340 may execute on another computing component that is physically distinct from storage manager 240, such as on a dedicated server that operates in conjunction with storage manager 240, but which may or may not be a logical component of storage manager 240. Data agent 342-D may be used for data restoration jobs in data center 2.

Data agent 342 (installed as data agent 342-S on the source client and 342-D on the destination client) is analogous to data agent 142 and additionally comprises enhanced functionality for operating according to the illustrative embodiment, e.g., changed block mapping driver 375, enhanced messaging to/from storage manager 240 (e.g., in regard to replication jobs and restore jobs), communications to/from volume-replicating server 201 (dotted line), etc.

Volume-level replication logic module 343 is a functional component of volume-replicating server 201, and may be implemented as executable software and/or firmware, which executes on the underlying computing device that hosts server 201. Module 343 may be implemented as a functional component of a data agent (not shown) that executes on server 201 (e.g., a data agent 342). When it executes according to the illustrative embodiment, module 343 is largely responsible for volume-level replication tasks primarily directed at moving blocks of data from source storage array 204-S to destination storage array 204-D, at least in part based on changed-block map(s) (e.g., map 377) received from client 202-S1.

Media agent 344 is analogous to media agent 144 and may additionally comprise enhanced functionality for operating according to the illustrative embodiment, such as operating on the volume-replicating server, interoperating with the volume-replicating logic module 343 as needed to move data to destination storage array 204-D, etc.

Management database 346 is analogous to management database 146 and may additionally comprise new data pertaining to volume-level replication jobs and restoration jobs according to the illustrative embodiment. Furthermore, management database 346 may comprise metadata identifying e.g., pairs of source volumes/LUNs and their corresponding destination volumes/LUNs relative to volume-level replication jobs; pairs of operationally correspondent source/destination clients such as 202-S1 and 202-D1, respectively; pointers to changed block maps in the source client 202-S and/or server 201; operational parameters of clients and volume-replicating servers to enable proper matching when executing replication jobs; etc.

Changed block mapping driver 375 is a functional component of data agent 342-S. When it executes according to the illustrative embodiment, driver 375 is largely responsible for monitoring the write operations to volume 250 of the associated application that executes on client 202-S1, e.g., application 110, and to generate and maintain a data structure that identifies the changed blocks relative to a baseline. For example, driver 375 may be responsible for generating changed block map 376. Driver 375 is shown here as a distinct component to ease understanding of the present disclosure, however, alternative embodiments are also possible within the scope of the present invention, wherein driver 375 may be embodied as a unified module within data agent 342, layered on existing data agent code, or may be a logical construct whose functionality is distributed through one or more other functional modules of the data agent, or in any combination thereof. In some alternative embodiments, driver 375 may execute apart from data agent 342.

Changed block map 376 is a data structure that identifies which blocks in volume 250 have changed as a result of write operations performed by application 110 executing on client 202-S1. Map 376 may be implemented in any number of ways, including as a "bitmap" that indicates whether a given block is changed or unchanged relative to a baseline such as the immediately preceding snapshot. This is illustrated in the example shown in Table 1:

TABLE 1

"Bitmap" Examples Of Changed Block Map 376

| Snapshot | Block 1 | Block 2 | Block 3 | ... | Block n |
|---|---|---|---|---|---|
| 01 (initial state) | changed | changed | changed | | changed |
| 02 | changed | changed | unchanged | | unchanged |
| 03 | unchanged | changed | unchanged | | unchanged |

Illustratively, each row above represents a "bitmap" of the changed blocks in a given snapshot relative to the immediately preceding snapshot. Thus, based on the example in Table 1, blocks 1 through n are all flagged as changed in reference to the initial snapshot of volume 250 (snapshot 01), because there is no predecessor snapshot. For snapshot 02, only blocks 1 and 2 are flagged as changed relative to snapshot 01, and for snapshot 03 only block 2 is flagged as changed relative to snapshot 02. As will be shown later, only changed blocks are replicated from the source volume to the destination volume for each successive snapshot. Changed block map 376 may be locally cached by client 202-S1 and/or may be stored in other accessible storage. In some embodiments, the information in map 376 may also be transmitted to storage manager 240 for storage in management database 346 or in another associated data structure.

Changed block map 377 may be a data structure like map 376 (or may be implemented as a different data structure), which is received by volume-replicating server from client 202-S1 (i.e., the information in changed block map 377 is received by volume-replicating server 201). For example, after a given snapshot is generated, e.g., snapshot 02, storage manager 240 and/or server 201 may instruct client 202-S1 to transmit the information in map 376 to volume-replicating server 201 and stored thereon in data structure 377. Subsequent data transfers performed by server 201 from source volume 250 to destination volume 251 are based on the information in changed block map 377, e.g., moving only changed blocks from each successive snapshot, which is much faster and more efficient than moving every block in every snapshot. Like map 376, map 377 may be locally cached by server 201 and/or may be stored in other accessible storage and may be transmitted to storage manager 240.

Hardware snapshots 01, 02, 03 are hardware-based snapshots of LUN S1 (comprising volume 250) which are generated and stored by storage array 204-S. In general, a hardware snapshot of a given LUN represents the entire LUN image (as well as any application-specific metadata, if any) in a set of blocks. The snapshot may be uniquely identified and tracked by storage array 204-S, and the snapshot and its constituent blocks may also be accessible to other components, such as volume-replicating server 201.

Storage manager 240 and/or server 201 may instruct storage array 204-S to take hardware snapshots of LUN S1; this may be implemented as separate snapshot-specific instructions and/or as one composite instruction, e.g., a snapshot schedule. The timing/frequency of the snapshots may be implementation-specific.

According to the illustrative embodiment, following the creating/storing of each snapshot in source storage array 204-S, volume-replicating server 201 (e.g., using volume-level replicating logic module 343) may identify the changed blocks in the respective snapshot (e.g., based on changed block map 377) and transfers them (e.g., transmits a copy of each changed block) to destination volume 251 in storage array 204-D. The initial snapshot (01) is transferred in full, as a baseline, but rather than transfer every block in every successive snapshot, only the changed blocks are transferred. This scheme is indicated by the "F+Δ . . . Δ" notation in FIG. 3, meaning that the first snapshot is transferred in full (all blocks), and only changed blocks in subsequent snapshots are transferred afterwards. This advantageously speeds up the replication process, because far fewer blocks need be transferred from source to destination. To perform the transfer of data from source to destination volume, server 201 may mount LUN S1 and LUN D1 while the volume-level replication job is underway.

Figure 4:
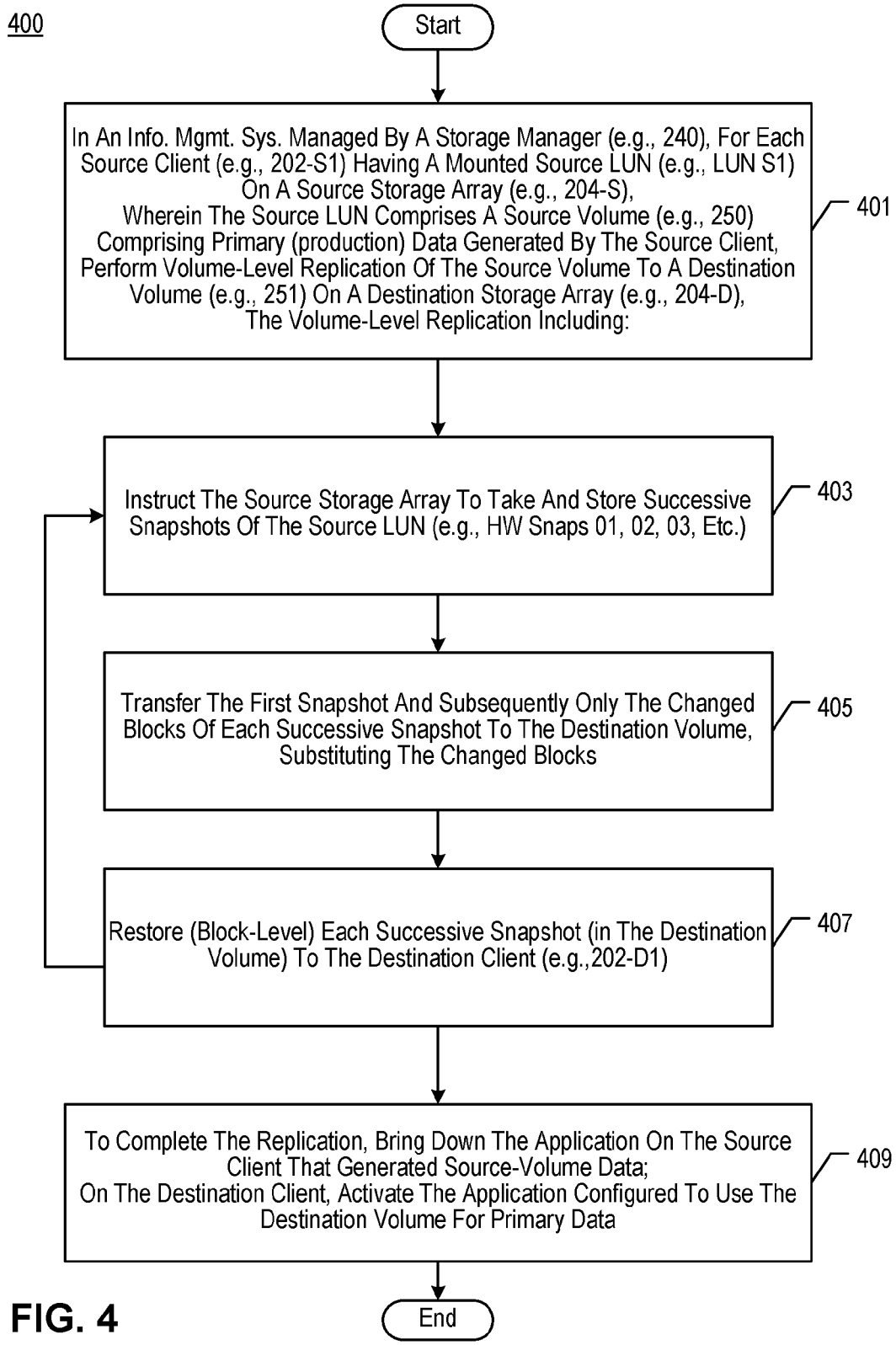
FIG. 4 depicts some salient operations of a method 400 according to an illustrative embodiment of the present invention.

FIG. 4 depicts some salient operations of a method 400 according to an illustrative embodiment of the present invention. In general, method 400 is executed collectively by the components of information management system 200, which is managed by storage manager 240. The responsible component relative to certain salient operation shall be recited below, though it is to be understood that alternative embodiments may be possible in which other component(s) execute a given operation in whole or in part, possibly in conjunction with other components of system 200. In general, method 400 is directed at performing one or more volume-level replication jobs from a source volume on a first storage array to a destination volume on a second storage array. The method may iterate to cover a plurality of clients in the information management system. Some of the details pertaining to method 400 and its constituent operations may have been described in detail in earlier figures and shall not be repeated below.

At block 401, in an information management system (e.g., 200) managed by a storage manager (e.g., 240), for each source client (e.g., 202-S1) having a mounted source LUN (e.g., LUN S1) on a source storage array (e.g., 204-S), wherein the source LUN comprises a source volume (e.g., 250) comprising primary (production) data generated by the source client, perform volume-level replication of the source volume to a destination volume (e.g., 251) on a destination storage array (e.g., 204-D), the volume-level replication including blocks 403, 405, and 407.

At block 403, the source storage array is instructed to generate and store successive snapshots of the source LUN (e.g., HW Snaps 01, 02, 03, etc.). As explained, the instruction(s) may be issued by storage manager 240 and/or server 201 and/or client 202-S1, and may take the form of a unified instruction (e.g., a schedule) or individual snapshot-specific instructions.

At block 405, the first snapshot and subsequently only the changed blocks of each successive snapshot are transferred to the destination volume, substituting the changed blocks for any corresponding pre-existing blocks in the destination volume. This operation has the effect of replicating the present snapshot to the destination volume. This block is described in further detail in a later figure.

At block 407, after a given snapshot has been successfully replicated to the destination volume, a restore operation may be performed. The restore operation restores (block-level) the present snapshot to the destination client (e.g., 202-D1) from the destination volume. For example, after the changed blocks of snapshot 02 (e.g., blocks 1 and 2 per Table 1) have been transferred from snapshot 02 to destination volume 251 and substituted accordingly, destination volume 251 may be said to comprise the data captured by snapshot 02.

At this point, a restore operation may be appropriate, making destination volume 251 available to client 202-D1, and particularly making it available as primary data to application 110 executing on client 202-D1. The restore operation may comprise mounting LUN D1 (which comprises the destination volume 251) to client 202-D1. Notably, the restore operation is a block-level operation that does not employ file-system drivers. Rather, because destination client 202-D1 (and the relevant application/file system 110) operationally corresponds to source client 202-S1 (and its corresponding component 110), the destination component may freely access the data in destination volume 251 without further data conversion or translation. This is advantageous for its speed as compared to file-level operations. Speedy volume-level replication and the associated restore therefore provide substantial advantages in replicating/moving very large amounts of data from one data center to another, geographically distinct, data center.

Control from block 407 may cycle back to block 403 for the next snapshot of a given source LUN used by the particular source client. Accordingly, for each source client, system 200 takes a snapshot, replicates the changed blocks resulting in the most current snapshot residing in a destination volume, and restores the snapshot to the destination client using the destination volume. Control may also/alternatively pass to block 409.

At block 409, to complete the volume-level replication begun at block 402, the application (e.g., 110) on the source client (e.g., 202-S1) that generated the primary data in source volume 250 is bought down. This may be performed, e.g., by data agent 342-S and/or by storage manager 240. Preferably, this occurs immediately after the final write to the source volume.

Furthermore, on the corresponding destination client (e.g., 202-D1), application 110 is activated, being configured to use the destination volume (e.g., 251) for primary data going forward. Preferably, the activation occurs after the final write from the source volume has been replicated to the destination volume according to the operations described above. This operation may be performed by data agent 342-D and/or by storage manager 240 and/or by another storage manager (not shown), e.g., operating in data center 2 or elsewhere, remotely. At this point in time, the application on the destination client may execute using the destination volume for primary data. Effectively, the application continues to execute (albeit on a different client computing device) using primary storage (e.g., volume 251 in LUN D1) that has been brought up to date by the volume-level replication according to the illustrative embodiment.

The delay in activating the application at data center 2 after the application at data center 1 has been deactivated should be relatively minor, if not altogether negligible. This is so at least in part because, as described in detail above, only the changed blocks of the final snapshot relative to its immediate predecessor are transferred from data center 1 to data center 2 after the final write to the source volume.

The preceding blocks in method 400 may be repeated for other source clients, using a corresponding volume replicating server 201 according to the type of operating system on the source client (e.g., Linux, AIX, Windows, etc.) Accordingly, control may pass back to block 401.

Figure 5:
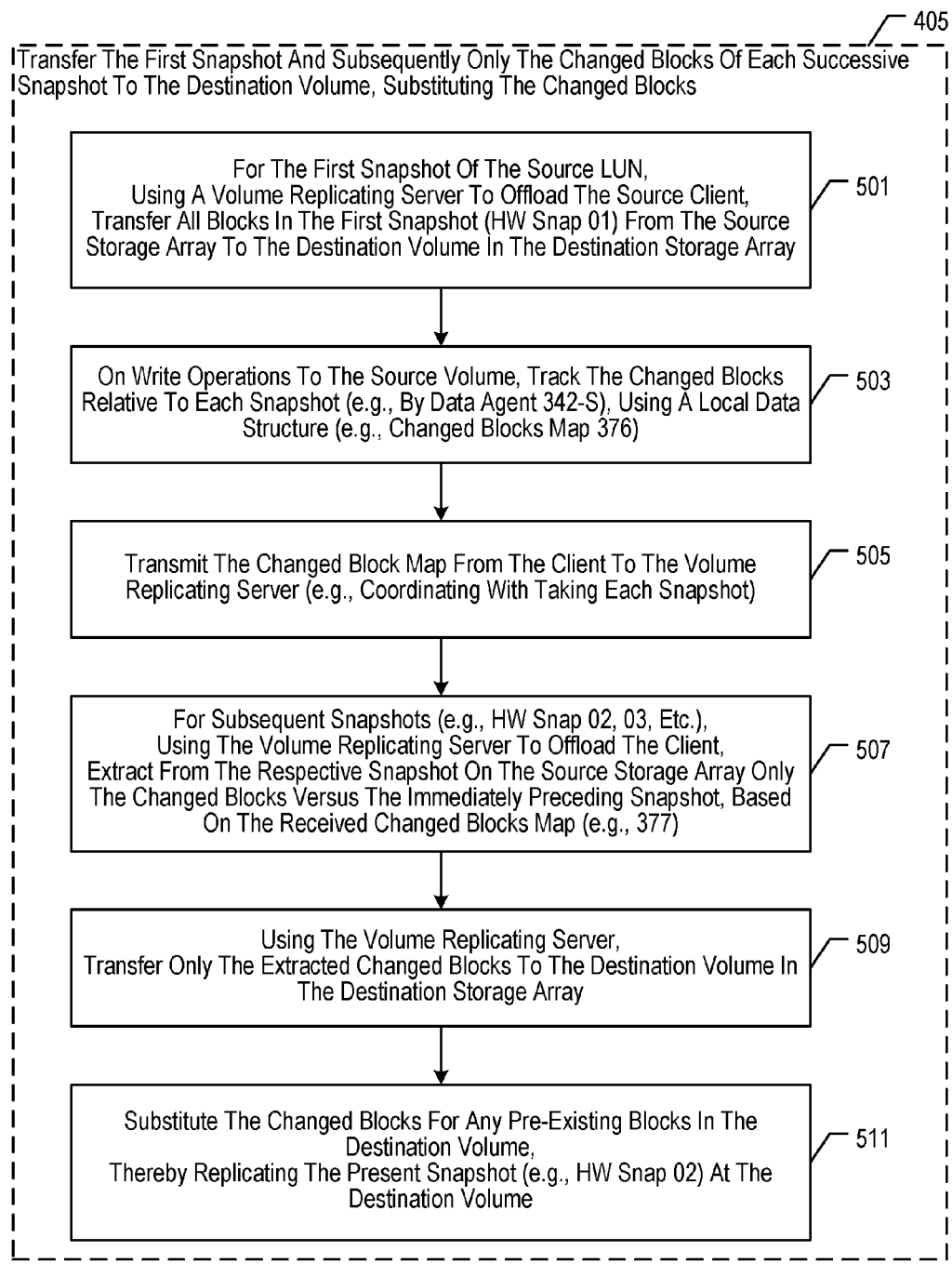
FIG. 5 depicts some salient details and sub-operations of block 405 in method 400.

FIG. 5 depicts some salient details and sub-operations of block 405 in method 400. In general, block 405 is directed at transferring the first snapshot in full and subsequently only the changed blocks of each successive snapshot to the destination volume, and substituting the changed blocks therein.

At block 501, on write operations to the source volume 250, track the changed blocks relative to each snapshot using a local data structure (e.g., changed blocks map 376). This operation may be performed by data agent 342-S using changed block mapping driver 375 to monitor a particular application 110 whose primary data is in source volume 250.

At block 503, the source client may transmit the information in changed blocks map 376 to volume replicating server 201 (stored as map 377 therein). This operation may be coordinated by storage manager 240 and/or server 201 relative to the snapshots taken by the source storage array 204-S. For example, after storage array 204-S reports to storage manager 240 that a given snapshot has been generated, storage manager 240 may instruct data agent 342-S to "freeze" its present changed blocks map 376 in reference to the given snapshot and transmit the changed-block information to server 201. Of course, other coordination/timing schemes may also be implemented within the scope of the present invention.

At block 505, based on the changed blocks map relative to the immediately preceding snapshot (e.g., 377), volume replicating server 201 may extract from the present snapshot on the source storage array only the changed blocks. Effectively, as indicated in reference to Table 1 above, this may mean that for the initial snapshot of a given source LUN (e.g., snapshot 01) all the blocks in that initial snapshot are extracted (and subsequently transferred to the destination volume). In alternative embodiments, the initial snapshot may be extracted in whole (all blocks) without consulting changed blocks map 377. For subsequent blocks, consulting the changed blocks map 377 ensures that only the changed blocks in the current snapshot relative to the immediately preceding snapshot are extracted from the source array. Notably, this operation (along with blocks 507 and 509) offload the source client from having to devote computing resources to these elements of the replication job, thus improving the performance of the client computing device in the production environment.

At block, 507 volume replicating server 201 transfers only the extracted blocks to the destination volume in the destination storage array. As shown, the blocks extracted from the current snapshot on the source storage array are transferred to the destination volume.

At block 509, volume replicating server 201 substitutes the changed blocks for any corresponding blocks that pre-exist in the destination volume, thereby replicating the present snapshot (e.g., HW Snap 02) to the destination volume 251. For example, block 2 from snapshot 02 replaces the pre-existing block 2 in the destination volume, and so on. When all substitutions are completed, the destination volume is a replica of the current snapshot, e.g., snapshot 02, and therefore may be restored to the destination client, e.g., 202-D1. Control passes from block 405 to the next block in method 400.

In regard to the components, blocks, operations and/or sub-operations described in reference to FIGS. 2-5, other embodiments are possible within the scope of the present invention, such that the above-recited components, steps, blocks, operations, and/or messages/requests/queries/instructions may be differently arranged, sequenced, sub-divided, organized, and/or combined. In some embodiments, a different component may initiate or execute a given operation.

Example Embodiments

A method according to the illustrative embodiment may comprise: in an information management system managed by a storage manager, replicating a source volume in a first storage array to a destination volume in a second storage array, wherein the source volume comprises data generated by a first client computing device in communication with a first logical unit number on the first storage array that comprises the source volume, wherein the replicating comprises: generating and storing, by the first storage array, a first snapshot of the first logical unit number comprising the source volume, generating and storing, by the first storage array, after the first snapshot, a second snapshot of the first logical unit number comprising the source volume, transferring, by a volume-replicating server, to the destination volume in the second storage array, based on a mapping of changed blocks received by the volume-replicating server from the first client computing device, only the changed blocks of the second snapshot relative to the first snapshot, and substituting, by the volume-replicating server, the changed blocks in the destination volume for any corresponding pre-existing blocks therein, thereby replicating, at a block level, the second snapshot to the destination volume; and restoring the second snapshot, at a block-level, from the destination volume to a second client computing device in communication with a second logical unit number on the second storage array, wherein the second logical unit number comprises the destination volume.

The method may further comprise: executing an application on the second client computing device, wherein the application uses the destination volume for primary data. The above-recited method wherein the volume-replicating server offloads the first client computing device by transferring the changed blocks to the second volume on the second storage array. The above-recited method wherein the volume-replicating server offloads the first client computing device by (i) extracting the changed blocks from the second snapshot on the first storage array, based on the mapping received from the first client computing device, and also (ii) transferring the extracted changed blocks to the second volume on the second storage array. The above-recited method wherein the generating and storing of the snapshots by the first storage array is performed in response to instructions received from the storage manager. The above-recited method wherein the generating and storing of the snapshots by the first storage array is performed in response to instructions received from a data agent executing on the first client computing device. The above-recited method wherein the generating and storing of the snapshots by the first storage array is performed in response to instructions received from the volume-replicating server. The above-recited method wherein the storage manager coordinates the timing of the generating of the snapshots by the first storage array with the corresponding mapping of the changed blocks performed by the first client computing device. The above-recited method wherein a data agent that executes on the first client computing device performs the mapping of the changed blocks relative to an immediately preceding snapshot. The above-recited method wherein the substituting of the changed blocks is performed by the volume-replicating server. The above-recited method wherein the block-level restoring of the second snapshot is initiated at the second client computing device, at least in part by mounting to the second client computing device, the second logical unit number that comprises the destination volume.

An illustrative information management system according to the illustrative embodiment may comprise: a volume-replicating server in communication with a first storage array and a second storage array; a first client computing device in communication with the client-replicating server and with the first storage array; the first storage array, comprising a source volume comprising primary data generated by the first client computing device, wherein the source volume is configured as a first logical unit number mounted to the first client computing device; wherein the first storage array is configured to: generate and store a first snapshot of the first logical unit number comprising the source volume, and generate and store, after the first snapshot, a second snapshot of the first logical unit number comprising the source volume; wherein the volume-replicating server is configured to: extract one or more changed blocks from the second snapshot on the first storage array, based on a mapping, received from the first client computing device, of changed blocks relative to the first snapshot, transfer the extracted changed blocks to a destination volume in the second storage array, and substitute the changed blocks in the destination volume for any corresponding pre-existing blocks therein, wherein the destination volume in the second storage array is a volume-level replica of the second snapshot.

The system may further comprise: a second client computing device comprising an application, wherein the application is configured to execute on the second client computing device based on the destination volume, and wherein the second snapshot in the destination volume is restored as primary data for the application. The above-recited system wherein the volume-replicating server is further configured to: instruct the first client computing device to generate the map of changed blocks in the second snapshot relative to the first snapshot, based on tracking, by a data agent executing on the first client computing device, which blocks are changed in the first volume by write operations performed by the first client computing device; and instruct the first client computing device to transmit the map of changed blocks to the volume-replicating server. The above-recited system may further comprise: a storage manager that is configured to: instruct the first client computing device to generate the map of changed blocks in the second snapshot relative to the first snapshot, based on tracking, by a data agent executing on the first client computing device, which blocks are changed in the first volume by write operations performed by the first client computing device; and instruct the first client computing device to transmit the map of changed blocks to the volume-replicating server.

Another illustrative method for volume-level replication of data generated in an information management system, may comprise: generating and storing, by a first storage array in the information management system, a first snapshot of a first logical unit number comprising a source volume on the first storage array, wherein the source volume comprises data generated by a first client computing device in the information management system; generating and storing, after the first snapshot, a second snapshot of the first logical unit number comprising the source volume; extracting, by a volume-replicating server in the information management system, one or more changed blocks from the second snapshot on the first storage array, based on a mapping of changed blocks relative to the first snapshot, wherein the mapping is received from the first client computing device; transferring, by the volume-replicating server, the extracted changed blocks to a destination volume in a second storage array; and substituting the changed blocks in the destination volume for any corresponding pre-existing blocks therein, wherein the destination volume in the second storage array is a volume-level replica of the second snapshot.

The method may further comprise: restoring the second snapshot, at a block-level, from the destination volume to a second client computing device in communication with a second logical unit number on the second storage array, wherein the second logical unit number comprises the destination volume. The method may further comprise: restoring the second snapshot, at a block-level, from the destination volume to a second client computing device in communication with a second logical unit number on the second storage array, wherein the second logical unit number comprises the destination volume; and executing an application on the second client computing device, wherein the application uses the destination volume for primary data. The above-recited method wherein the generating and storing of the snapshots by the first storage array is performed in response to instructions received from the volume-replicating server.

Another illustrative method for volume-level replication of data generated in an information management system may comprise: instructing, by a storage manager that manages the information management system, a first storage array to generate and store a first snapshot of a first logical unit number comprising a source volume on the storage array, wherein the source volume comprises data generated by a first client computing device in the information management system; instructing, by the storage manager, the first storage array to generate and store a second snapshot, after the first snapshot, of the first logical unit number comprising the source volume; instructing, by the storage manager, a volume-replicating server to transfer from the second snapshot on the first storage array to a destination volume in a second storage array only the changed blocks in the second snapshot, based on a mapping of changed blocks relative to the first snapshot, resulting in the second snapshot being replicated to the destination volume in the second storage array; and instructing a second client computing device in the information management system to restore the second snapshot, at a block level, from the destination volume on the second storage array.

The above-recited method wherein the second snapshot is being replicated at a block level. The above-recited method may further comprise: instructing, by the storage manager, the first client computing device to generate the map of changed blocks in the second snapshot relative to the first snapshot, based on tracking, by a data agent executing on the first client computing device, which blocks are changed in the first volume by write operations performed by the first client computing device. The above-recited method wherein the storage manager coordinates the timing of the snapshots by the first storage array with the corresponding mapping of the changed blocks performed by the first client computing device.

According to an illustrative embodiment of the present invention a computer-readable medium, excluding transitory propagating signals, storing instructions that, when executed by at least one storage manager in an information management system, may cause the storage manager to perform operations comprising: instructing a first storage array to generate and store a first snapshot of a first logical unit number comprising a source volume on the storage array, wherein the source volume comprises data generated by a first client computing device in the information management system; instructing the first storage array to generate and store a second snapshot, after the first snapshot, of the first logical unit number comprising the source volume; instructing a volume-replicating server to transfer from the second snapshot on the first storage array to a destination volume in a second storage array only the changed blocks in the second snapshot, based on a mapping of changed blocks relative to the first snapshot, resulting in the second snapshot being replicated to the destination volume in the second storage array; instructing a second client computing device in the information management system to restore the second snapshot, at a block level, from the destination volume on the second storage array; and wherein the destination volume in the second storage array is a volume-level replica of the second snapshot.

The computer-readable medium, excluding transitory propagating signals, storing instructions that, when executed by at least one storage manager in an information management system, may also cause the storage manager to perform operations further comprising: instructing the first client computing device to generate the map of changed blocks in the second snapshot relative to the first snapshot, based on tracking, by a data agent executing on the first client computing device, which blocks are changed in the first volume by write operations performed by the first client computing device. The computer-readable medium, excluding transitory propagating signals, storing instructions that, when executed by at least one storage manager in an information management system, may further cause the storage manager to perform operations further comprising: instructing the first client computing device to generate the map of changed blocks in the second snapshot relative to the first snapshot, based on tracking, by a data agent executing on the first client computing device, which blocks are changed in the first volume by write operations performed by the first client computing device; and instructing the first client computing device to transmit the map of changed blocks to the volume-replicating server. The computer-readable medium, excluding transitory propagating signals, storing instructions that, when executed by at least one storage manager in an information management system, may also cause the storage manager to perform operations further comprising: coordinating the timing of the snapshots generated by the first storage array with the corresponding mapping of the changed blocks performed by the first client computing device.

An illustrative information management system for volume-level replication of data generated by a first client computing device in the information management system, according to an illustrative embodiment, may comprise: a volume-replicating server in communication with a first storage array and the first client computing device; a first snapshot, generated and stored by the first storage array, of a first logical unit number comprising a source volume on the storage array, wherein the source volume comprises data generated by the first client computing device; a second snapshot, also generated and stored by the first storage array after the first snapshot, of the first logical unit number comprising the source volume; wherein the volume replicating server is configured to: extract one or more changed blocks from the second snapshot on the first storage array, based on a mapping, received from the first client computing device, of changed blocks relative to the first snapshot, transfer the extracted changed blocks to a destination volume in a second storage array, and substitute the changed blocks in the destination volume for any corresponding pre-existing blocks therein, wherein the destination volume in the second storage array is a volume-level replica of the second snapshot.

The system may further comprise: a second client computing device comprising an application, wherein the application is configured to execute on the client computing device based on the destination volume, and wherein the second snapshot in the destination volume is restored as primary data for the application.

According to an illustrative embodiment, a computer-readable medium, excluding transitory propagating signals, storing instructions that, when executed by at least one volume-replicating server in an information management system, may cause the volume-replicating server to perform operations comprising:

instructing a first storage array in the information management system, to generate and store a first snapshot of a first logical unit number comprising a source volume on the first storage array, wherein the source volume comprises data generated by a first client computing device in the information management system; instructing the first storage array, after the first snapshot, to generate and store a second snapshot of the first logical unit number comprising the source volume; extracting one or more changed blocks from the second snapshot on the first storage array, based on a mapping of changed blocks relative to the first snapshot, wherein the mapping is received from the first client computing device; transferring the extracted changed blocks to a destination volume in a second storage array; and substituting the changed blocks in the destination volume for any corresponding pre-existing blocks therein; wherein the destination volume in the second storage array is a volume-level replica of the second snapshot.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising:
   in an information management system managed by a storage manager, block-level replicating a source volume in a first block storage array to a destination volume in a second block storage array by way of a volume-replicating server interposed between and in communication with the first block storage array and the second block storage array, wherein the source volume comprises data generated by a first application executing on a first client computing device in communication with a first logical unit number configured on the first block storage array that comprises the source volume,
   wherein the replicating comprises:
      generating and storing, by the first block storage array, a first snapshot of the entire source volume,
      after the first snapshot, detecting, by a first data agent associated with the first application and also executing on the first client computing device, changed blocks being written by the first application to the source volume, generating and storing, by the first block storage array, after the first snapshot, a second snapshot of the entire source volume, after the second snapshot, transmitting, by the first data agent executing on the client computing device to the volume-replicating server, a mapping of blocks that changed between the first snapshot and the second snapshot, extracting, by the volume-replicating server from the second snapshot stored in the first block storage array, only the changed blocks according to the mapping received from the first data agent, transferring, by the volume-replicating server to the destination volume in the second block storage array, only the extracted changed blocks, and substituting, by the volume-replicating server, the changed blocks into the destination volume in place of corresponding pre-existing blocks therein, thereby replicating the second snapshot at the second block storage array for use by a second client computing device in communication with a second logical unit number comprising the destination volume;

performing a block-level restore operation of the replicated second snapshot in the destination volume at the second block storage array to the second client computing device, wherein the block-level restore operation is performed at least in part by a second data agent associated with a second application, wherein the second application and the second data agent execute on the second client computing device;

on the second client computing device, activating the second application having access to the restored second snapshot in the destination volume as primary data therefor; and wherein the volume-replicating server offloads the first client computing device from performing the extracting, transferring, and substituting operations to enable the second application to access the restored second snapshot in the destination volume on the second storage array.

2. The method of claim 1 wherein the first data agent is configured to monitor write operations to the source volume issued by the first application for detecting the changed blocks, and wherein the first data agent is further configured to generate the mapping of blocks that changed between the first snapshot and the second snapshot.

3. The method of claim 1 wherein the volume-replicating server executes a media agent component of the information management system, which interoperates with the second data agent to perform the block-level restore operation of the replicated second snapshot in the destination volume.

4. The method of claim 1 wherein the generating and storing of the snapshots by the first block storage array is performed in response to instructions received from the storage manager.

5. The method of claim 1 wherein the generating and storing of the snapshots by the first block storage array is performed in response to instructions received from the first data agent executing on the first client computing device.

6. The method of claim 1 wherein the generating and storing of the snapshots by the first block storage array is performed in response to instructions received from the volume-replicating server.

7. The method of claim 1 wherein the storage manager coordinates the timing of the generating of the snapshots by the first block storage array with the corresponding mapping of the changed blocks performed by the first data agent executing on the first client computing device.

8. The method of claim 1 wherein the block-level restore operation is initiated at the second client computing device, at least in part by mounting to the second client computing device, the second logical unit number that comprises the destination volume.

9. An information management system comprising:
a volume-replicating server in communication with a first block storage array and a second block storage array;
a first client computing device in communication with the volume-replicating server and with the first block storage array;
the first block storage array, comprising a source volume comprising primary data generated by a first application on the first client computing device, wherein the source volume is configured as a first logical unit number mounted to the first client computing device;
wherein the first block storage array is configured to:
generate and store a first snapshot of the first logical unit number comprising the source volume, and
generate and store, after the first snapshot, a second snapshot of the first logical unit number comprising the source volume;
a first data agent hosted by the first client computing device, wherein the first data agent is configured to:
detect changed blocks being written by the first application to the source volume,
generate a mapping of one or more blocks that changed between the first snapshot and the second snapshot, and
transmit the mapping to the volume-replicating server;
wherein the volume-replicating server is configured to:
extract only the one or more changed blocks from the second snapshot on the first block storage array, according to the mapping received from the first data agent on the first client computing device,
transfer the extracted changed blocks to a destination volume in the second block storage array, and
substitute the changed blocks into the destination volume in place of corresponding pre-existing blocks therein, wherein after the substitute the destination volume in the second block storage array is a volume-level replica of the second snapshot; and
wherein the first client computing device is offloaded by the volume-replicating server from performing the extract, transfer, and substitute operations to create the volume-level replica of the second snapshot in the second block storage array; and
wherein the information management system further comprises a second client computing device hosting a second application and an associated second data agent, wherein the second application is configured to, after a block-level restore operation of the destination volume, execute on the second client computing device with access to the destination volume replica of the second snapshot.

10. The system of claim 9 wherein the volume-replicating server is further configured to:

instruct the first data agent on the first client computing device to generate the mapping of the one or more blocks that changed between the first snapshot and the second snapshot, and instruct the first data agent on the first client computing device to transmit the mapping of the one or more changed blocks to the volume-replicating server.

11. The system of claim 9 further comprising a storage manager that is configured to:

instruct the first data agent on the first client computing device to generate the mapping of the one or more blocks that changed between the first snapshot and the second snapshot, and instruct the first data agent on the first client computing device to transmit the mapping of the one or more changed blocks to the volume-replicating server.

12. A method for block-level replication of a volume of data generated in an information management system, the method comprising:

generating and storing, by a first block storage array in the information management system, a first snapshot of a source volume on the first block storage array, wherein the source volume comprises data generated by a first application that executes on a first client computing device in the information management system;

after the first snapshot, monitoring write operations performed by the first application to the source volume, by a first data agent which is associated with the first application and which also executes on the first client computing device, to detect changed blocks written by the first application;

generating and storing by the first block storage array, after the first snapshot, a second snapshot of the first logical unit number comprising the source volume;

after the second snapshot, transmitting, by the first data agent to a volume-replicating server in the information management system, a mapping of blocks that the first data agent detected have changed between the first snapshot and the second snapshot, wherein the volume-replicating server is a computing device that is distinct from the first client computing device, and further wherein the volume-replicating server is in communication with the first block storage array comprising the source volume and with a second block storage array, and wherein the first client computing device is not in communication with the second block storage array;

extracting, by the volume-replicating server, only the changed blocks from the second snapshot on the first block storage array, according to the mapping of changed blocks received from the first data agent on the first client computing device;

transferring, by the volume-replicating server, the extracted changed blocks to a destination volume in the second block storage array; and substituting, by the volume-replicating server, the extracted changed blocks into the destination volume in place of corresponding pre-existing blocks therein, wherein after the substituting the destination volume in the second block storage array is a volume-level replica of the second snapshot for use by a second application that executes on a second client computing device after a block-level restore operation performed at least in part by a second data agent associated with the second application and also executing on the second client computing device; and wherein the first client computing device is offloaded by the volume-replicating server from performing the extracting, transferring, and substituting operations to create a volume-level replica of the second snapshot in the destination volume of the second block storage array.

13. The method of claim 12 further comprising:

restoring the replica of the second snapshot, at a block-level, from the destination volume to the second application on the second client computing device; and executing the second application on the second client computing device, wherein the application uses the destination volume for primary data.

14. The method of claim 12 wherein the generating and storing of the snapshots by the first block storage array is performed in response to instructions received from the volume-replicating server.

* * * * *